United States Patent [19]

Herbert

[11] Patent Number: 4,653,168

[45] Date of Patent: Mar. 31, 1987

[54] METHOD AND APPARATUS FOR TAKING UP A BOARD ROAD

[75] Inventor: Francis A. Herbert, Schriever, La.

[73] Assignee: South Louisiana Contractors Inc., Lafayette, La.

[21] Appl. No.: 318,821

[22] Filed: Nov. 6, 1981

[51] Int. Cl.4 .......................... B23P 19/00; B62B 9/04; B65G 57/00

[52] U.S. Cl. ...................................... 29/426.5; 280/24; 414/28

[58] Field of Search .............................. 414/28, 35, 97; 29/426.5; 280/12 M, 12 E, 24

[56] References Cited

U.S. PATENT DOCUMENTS

| | | | |
|---|---|---|---|
| 883,258 | 3/1908 | Tolle | 280/24 |
| 2,335,556 | 10/1942 | Wilson | 94/13 |
| 2,382,789 | 4/1943 | Guignon, Jr. | 94/13 |
| 2,635,659 | 12/1947 | Gerdine | 144/309 |
| 2,652,753 | 1/1950 | Smith | 94/13 |
| 2,831,589 | 2/1958 | Way | 214/147 |
| 2,912,909 | 10/1959 | Hart | 94/11 |
| 3,330,056 | 10/1963 | Woodside et al. | 37/134 |
| 3,525,503 | 5/1959 | Hebert | 254/124 |
| 3,647,092 | 3/1972 | Bulat et al. | 414/28 |
| 3,651,554 | 3/1972 | Hebert | 29/200 |
| 3,651,966 | 3/1972 | Willett | 214/147 |
| 3,669,464 | 6/1972 | Linzmeler | 280/47.34 |
| 4,289,420 | 9/1981 | Davis et al. | 404/35 |

FOREIGN PATENT DOCUMENTS 1067996 11/1959 Fed. Rep. of Germany .

*Primary Examiner*—Howard N. Goldberg
*Assistant Examiner*—Steven Nichols
*Attorney, Agent, or Firm*—Wilkinson, Mawhinney & Theibault

[57] ABSTRACT

The present disclosure is directed to a method and apparatus for taking up a board road the bottom layer of boards of which have been laid with their major axes transversely of the road and the top layer of boards of which are nailed to the bottom layer with the major axes of the boards of the top layer being longitudinally of the direction of the board road which provides a grasping and unnailing station for grasping a plurality of the longitudinally laid boards and breaking their nailed connection with the under layer of transversely laid boards, thereafter stacking said boards in layers at a stacking station to be baled into bundles, while bending the nails flat which upstand from each board as the layers of boards are formed at the stacking station and thereafter baling the stacked layers of boards into bundles and transporting the bundles of stacked boards to inventory.

5 Claims, 13 Drawing Figures

METHOD AND APPARATUS FOR TAKING UP A BOARD ROAD

TECHNICAL FIELD

My invention relates to the taking up of previously laid board roads of the type for supporting heavy vehicles and equipment for travel over swamp and marsh land as well as cane fields and the like from hard surface roads from a highway to a drilling site for oil wells. The take up method and apparatus not only breaks the nailed connection between boards mechanically but also stacks the boards in 50 board bundles for baling and subsequent transfer to inventory for reuse in laying another board road.

BACKGROUND ART

The laying of a board road has for at least the past 40 years been a manual task as has been the taking up thereof. The road is laid by placing a first layer of boards with their major axis along the line of travel of the road in adjacent staggered abutting longitudinal relationship. A second layer of boards are laid on the first layer with their major axes at right angles to the first layer. A third layer of boards are laid over the second layer with their axes at a right angle to the second layer and two spaced apart groups of 5 or 6 boards spaced about 30 inches apart define the wheel travel surface for vehicles using the board road. The boards of this third or top layer are staggered in abutting longitudinal relationship transversely and are nailed to the second layer about 5 nails per 16 ft. board to stabilize the travel surface. This board road may be 50 ft. to 5 miles in length.

The road described above is a 3 ply road; however, depending upon the compaction of the ground over which it is layed and the gross weight of the vehicles traveling thereover the road may be six or nine ply which would only require adding additional layers as described above.

When it is time to take up the board road such by way of example when the drill site at the end of the road resulted in a dry hole it has been customary to employ a crew of from 8 to 15 men, a truck with an A frame and cable winch and a swamper who puts the cable around a stack of boards 5 wide and 10 high with the nails bent so the boards will be flat and the bundle is then baled by the swamper. The baled bundle is then transported to inventory.

The only prior art known by me prior to this disclosure directed to the art of board roads is:

U.S. Pat. No. 2,335,556 C. N. Wilson
U.S. Pat. No. 2,652,753 E. E. Smith
U.S. Pat. No. 2,382,789 E. S. Guignon Jr.
U.S. Pat. No. 2,912,909 A. P. Hart
U.S. Pat. No. 4,289,420 M. L. Davis et al.

The mechanical apparatus for taking up nailed boards are my two prior patents U.S. Pat. Nos. 3,525,503 and 3,651,554.

Clam shell grabs which can be opened and closed hydraulically as well as rotated horizontally at least 90° about their suspension axis are:

U.S. Pat. No. 2,831,589 G. W. Way
U.S. Pat. No. 3,330,056 F. G. Woodside et al.
U.S. Pat. No. 3,651,966 H. A. Willett
German Pat. No. 1,067,996 1959.

Wood receiving and stacking frames are exemplified in:

U.S. Pat. No. 2,635,659 T. F. Gerdine
U.S. Pat. No. 3,669,464 L. J. Linzmeier.

DISCLOSURE OF THE INVENTION

In accordance with the method of my invention I take up the board road which has been laid as described hereinabove by mechanically grasping a plurality of the longitudinally laid boards and break or disassemble their nailed connection with the under layer of transversely laid boards; thereafter I stack the boards at a stacking station or board bundling cradle, bending the nails flat which upstand from each board as the layers of boards are formed in fifty board bundles. Upon completion of each 50 board bundle I then lift the bundle clear of the cradle or stacking station and bale the bundle and transport the baled bundle to inventory. As the take up proceeds from the drill site to the access road the stacking station is advanced over a portion of the board road which has not been taken up.

One form of apparatus for practicing my method comprises a self propelled crawler unit having a horizontally traverse rotary top side works capable of rotating at least 180° with an elevatable dip stick on the free end of which is mounted a grab having openable and closeable jaws mounted on a horizontally rotatable support which is rotatable through at least 105° relative to the dip stick, and a board bundling cradle having an open top frame the major axis of which is positioned transversely of the road to be taken up. The frame is mounted on conveyance means which are supported on the board road to be taken up by engagement of the grab of the crawler unit with the frame to pull the frame over the board road.

The method and apparatus of the present invention has reduced the work crew down from 8 to 15 men to 3 to 5 men which take up more 50 board bundles per hour at almost one-third of the cost of the manual operation described hereinabove.

THE BEST MODE FOR CARRYING OUT THE INVENTION

Figures 1, 1A:
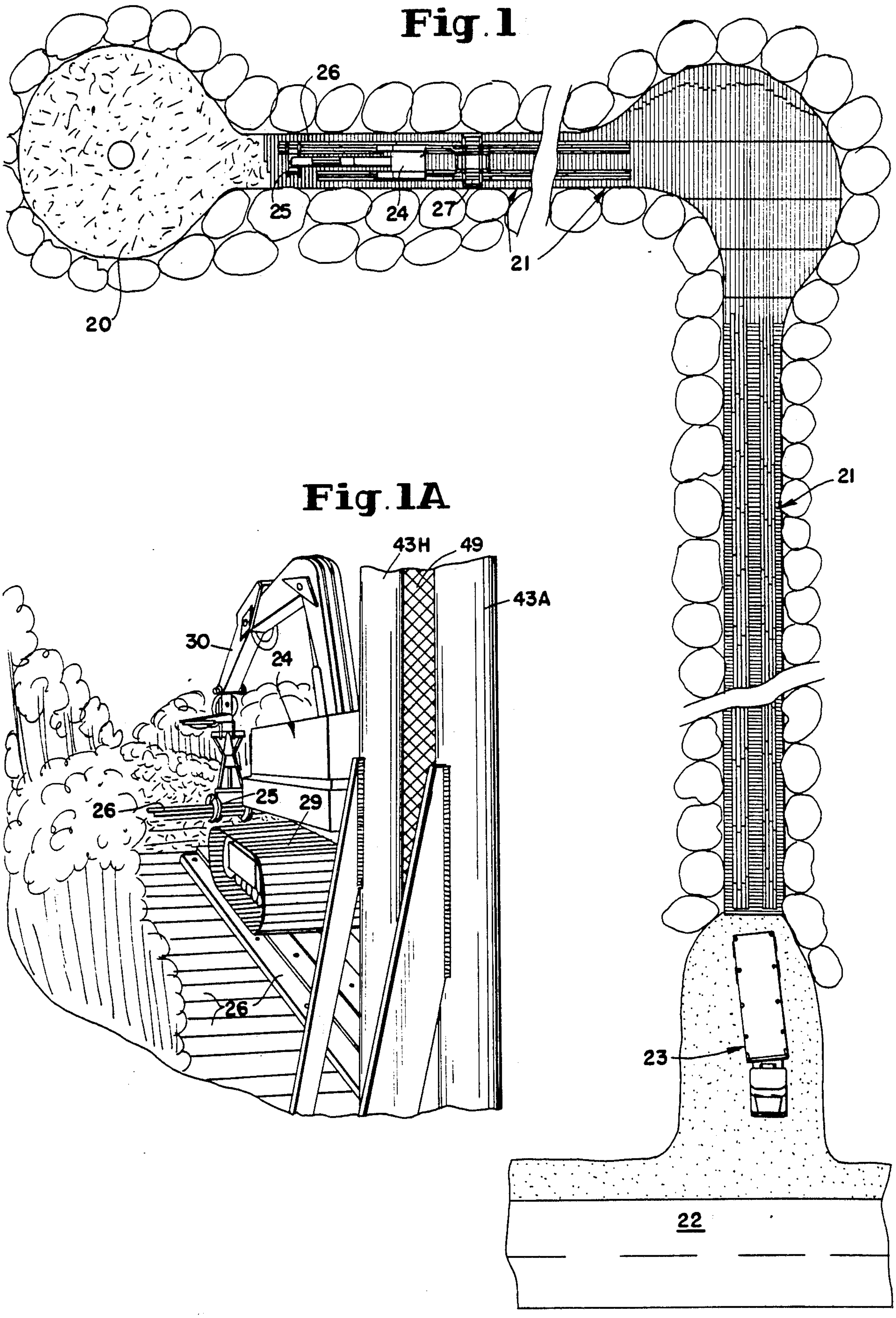
FIG. 1 is an aerial schematic view of drilling site with board road.
FIG. 1A is a fragmentary view looking at a board road being removed.
Figure 9:
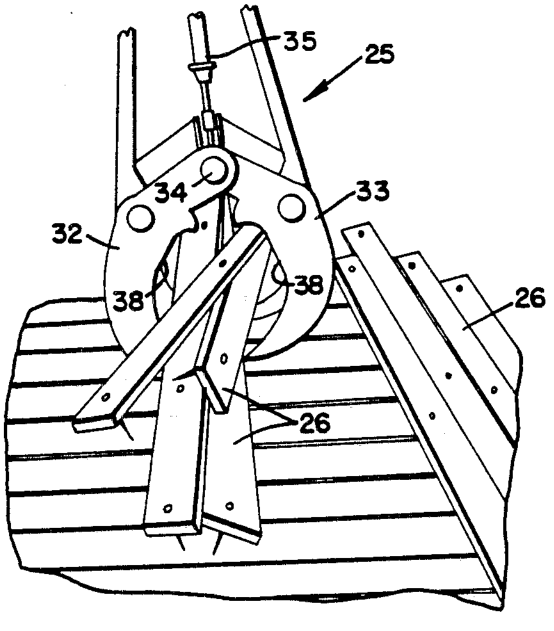
FIG. 9 is a perspective view of the grab jaws pulling a plurality of boards from their nailed position.
Figure 10:
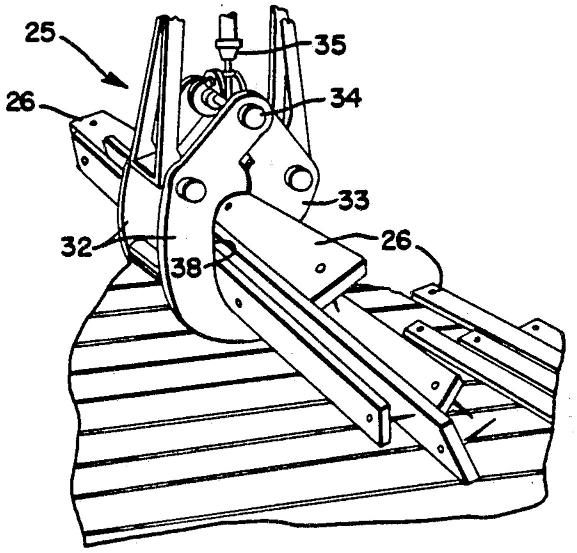
FIG. 10 is a perspective view of the grab jaws grasping and lifting a plurality of boards to place them in the stacking cradle.
Figure 12:
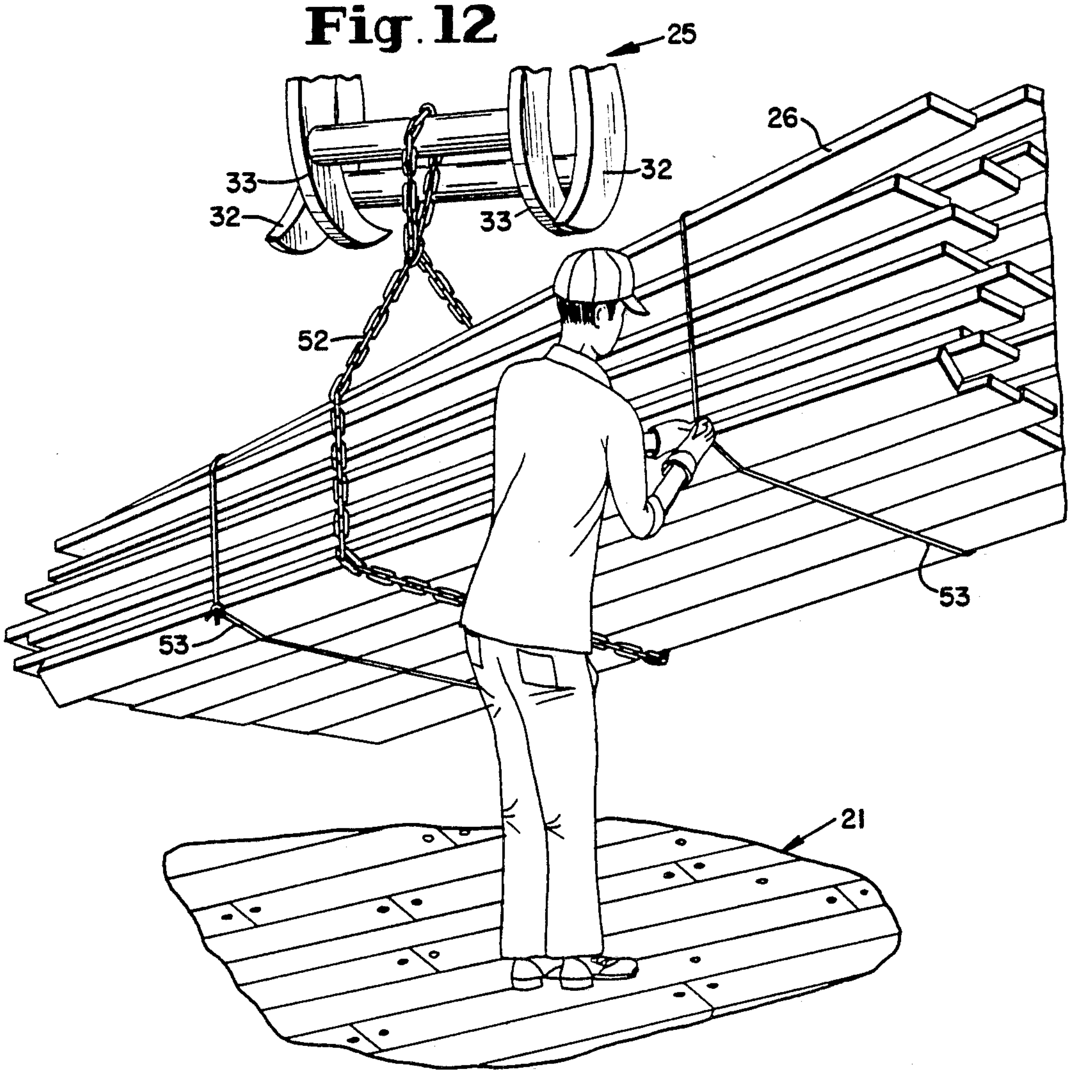
FIG. 12 is a perspective view of a man baling a 50 board bundle.

Referring now to FIG. 1, 20 designates an oil well drilling site which has been serviced over a board road 21 to a highway access road 22 so that tractor trailer units 23 can bring in and take away heavy equipment. The drill site shown was a dry hole and all surface equipment has been removed and now the board road 21 is being removed from the drill site 20 toward the access road 22. At the top of FIG. 1 a self-propelled crawler unit 24 of the type shown in FIG. 2 having a grab 25 is removing boards 26 as shown in FIGS. 9 and 10 and stacking them in a board cradle 27 to make up 50 board bundles which are baled as shown in FIG. 12 for transport to the tractor trailer unit 23 for transport to an inventory terminal.

THE METHOD

The board road to be taken up has a basic 3 ply structure but may be of a greater or lesser number of plys depending upon the compaction of the ground over which it is laid and the weight of the equipment to be transported thereover. The bottom layer is put down with the major axis of the boards longitudinally of the roadway. Each board is about 2 inches by 8 inches and about 16 feet long. The intermediate layer is laid over the bottom layer with the major axes of the boards transversely of the roadway. The top layer is layed in two spaced apart groups of 4 or 5 boards each with their axes longitudinally of the roadway to define vehicle transport surfaces.

The only fastening of the boards together is by 50 penny nails $5\frac{1}{2}''$ long, one nail about every three feet along only the top layer of longitudinally disposed boards.

Figure 11:
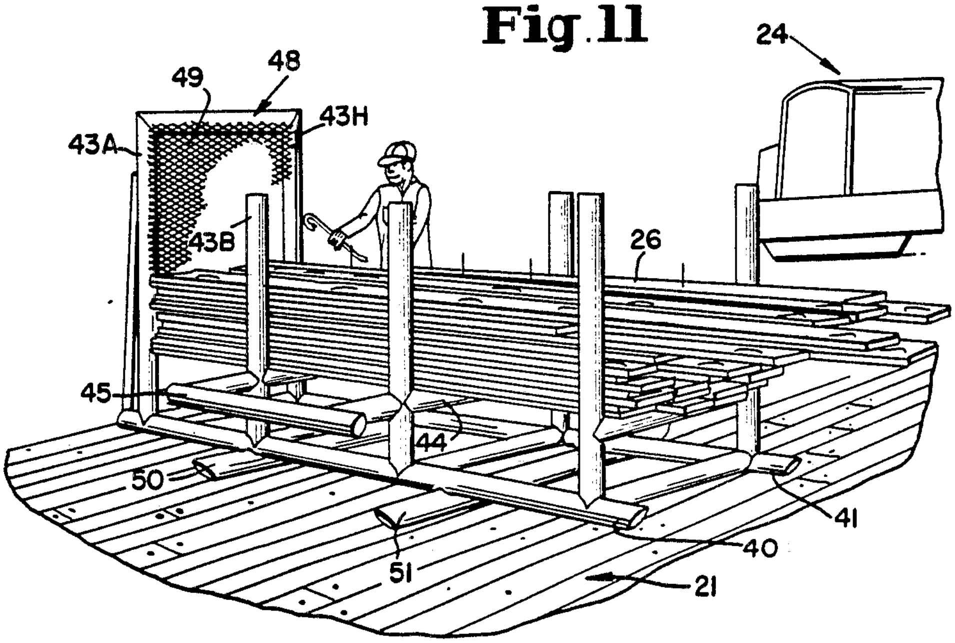
FIG. 11 is a perspective view of boards stacked in the sled while a man flattens nails before baling.

The first step is to simultaneously grasp a plurality of boards while disassembling their nailed connection as shown in FIGS. 9 and 10. Thereafter the boards are stacked in layers at a stacking station as shown in FIG. 11, the nails bent and boards accumulated in bundles of 5 boards wide and 10 layers high. Thereafter they are 7. baled in 50 board bundles as shown in FIG. 12 and placed on a transport vehicle for return to inventory.

The method of take up is from the drill site toward the highway. The stacking station as well as the grasping and unnailing station is moved over the surface of the board road to be taken up. The stacking station is movable toward and away from the grasping and unnailing station.

THE APPARATUS

Figure 2:
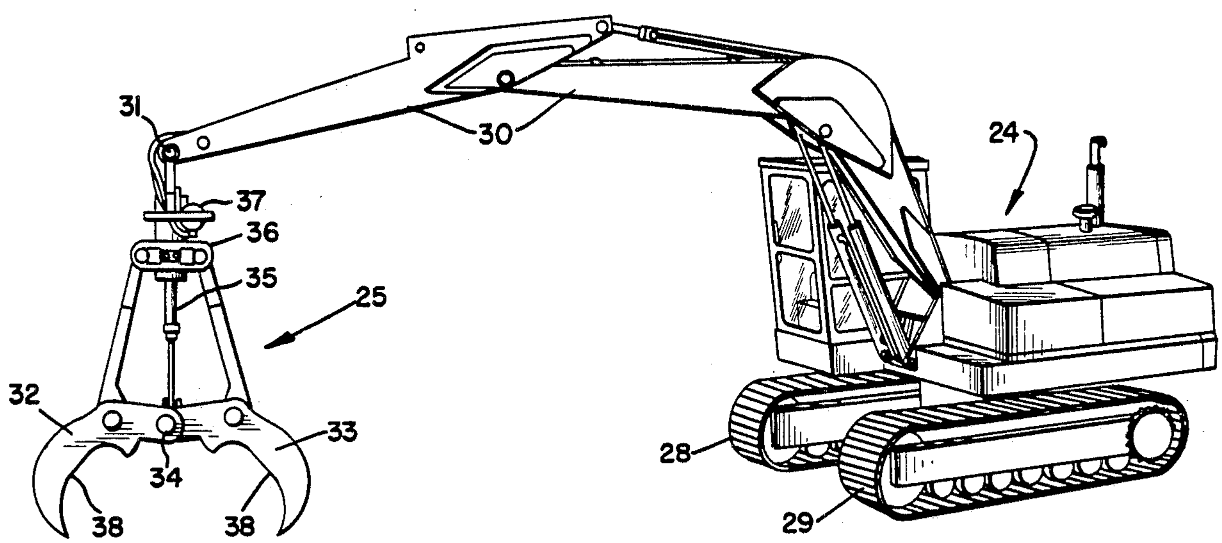
FIG. 2 is a perspective view of vehicle and attachments comprising the grasping and unnailing station.
Figure 3:
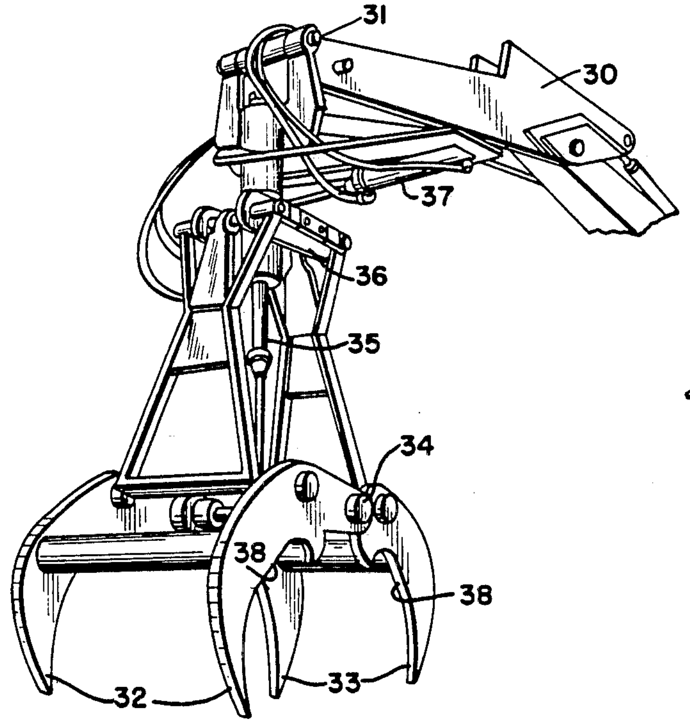
FIG. 3 is a perspective view of the grab forming the grasping and unnailing means.
Figure 4:
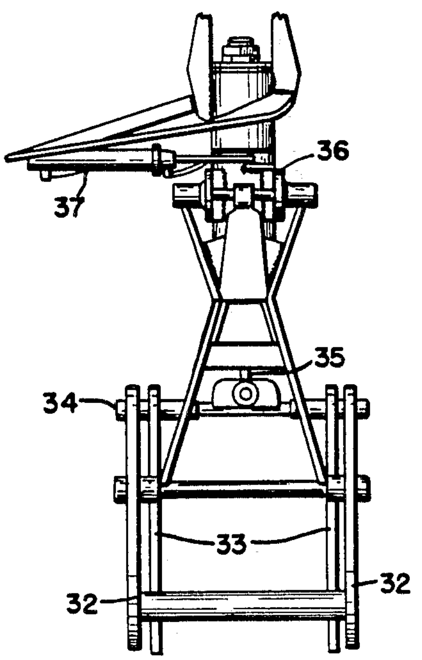
FIG. 4 is a rear view of the grab of FIG. 3 showing the turning means.

Referring now to FIGS. 2 through 4, the crawler unit 24 is shown with the grab 25. The crawler as shown is a self-propelled machine of the type manufactured by John Deere known as a JD690-B having two bottom endless propulsion tracks 28, 29 on top of which is carried a top side works including an elevatable dip stick 30 to which the grab 25 is pivoted at 31. The top side works is horizontally rotatable relative to the propulsion tracks 28, 29 through 360° so that as shown in FIG. 2 the dip stick 30 can be swung to the rear by rotating the top side either to the right or left.

Figure 8:
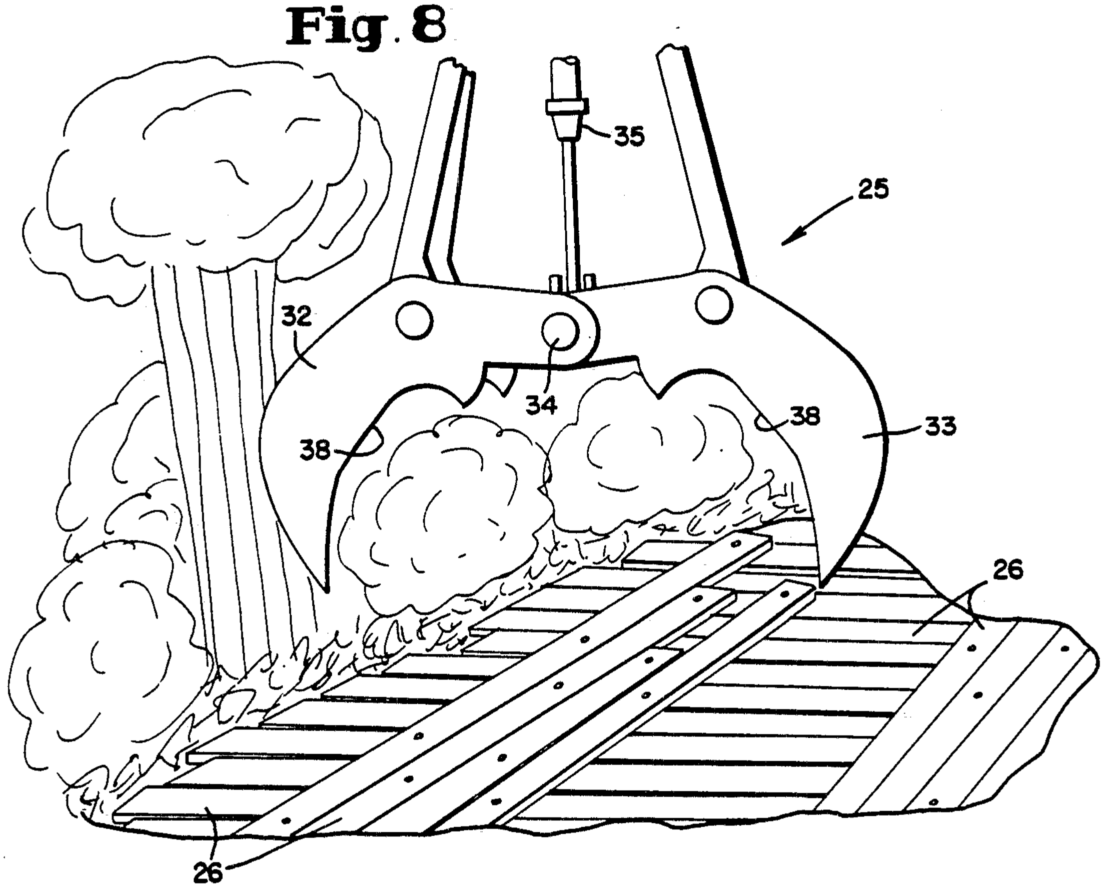
FIG. 8 is an end view of jaws open and approaching the board road.

The grab 25 has a pair of front and rear jaws 32, 33 pivoted at 34 to be operated by a hydraulic cylinder and ram 35 connected to a frame 36 which may be rotated up to 106° horizontally relative to the pivot 31 at the end of the dip stick 30 by cylinder and ram unit 37. As shown best in FIGS. 8, 9 and 10, the inner faces of each pair of opposing jaws has flat portions 38 for firmly grasping a plurality of boards.

The unit as shown in FIG. 2 comprises the grasping and unnailing station of the method.

Figure 5:
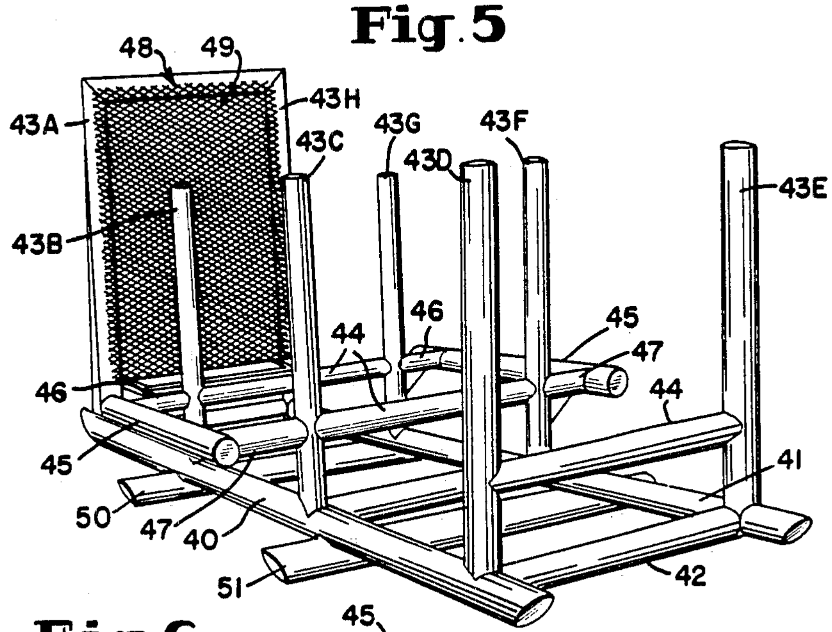
FIG. 5 is a perspective view of stacking station or board bundling cradle.
Figure 6:
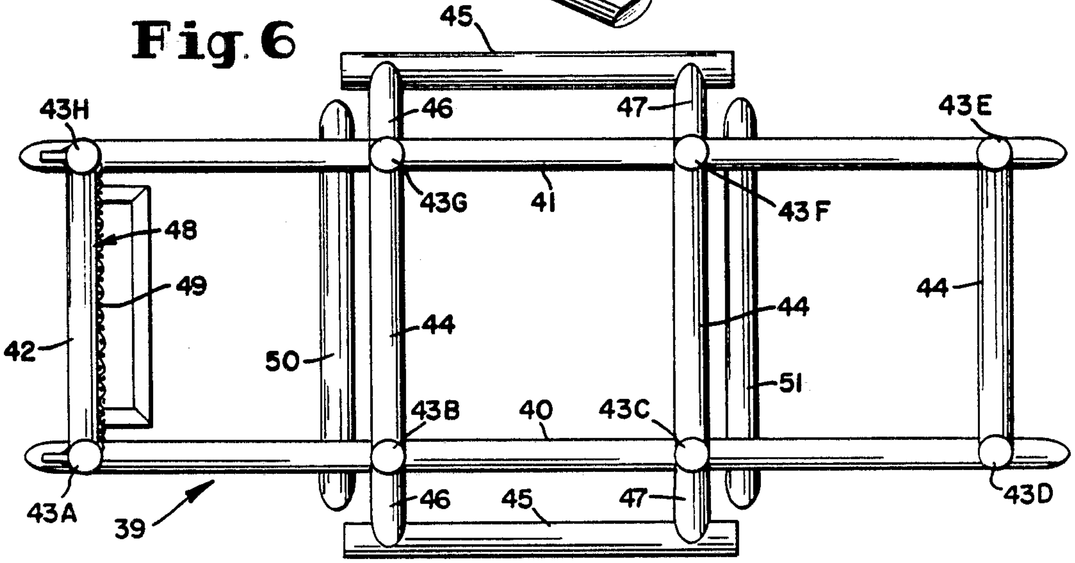
FIG. 6 is a top plan view of the board sled of FIG. 5.
Figure 7:
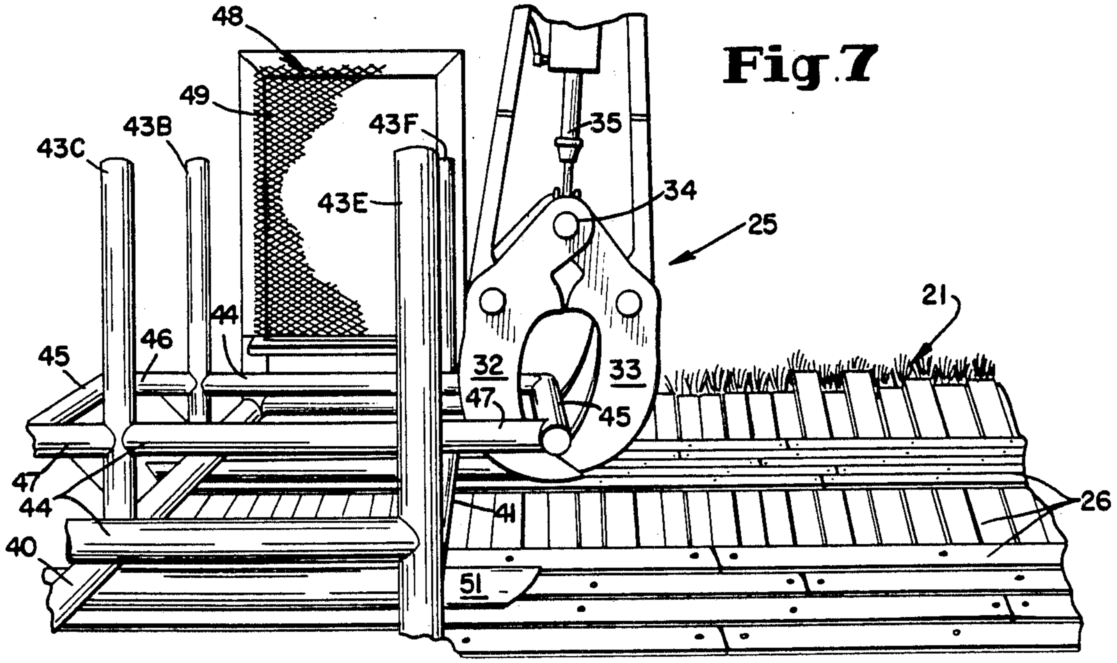
FIG. 7 is a perspective view showing the grab jaws positioning the stacking cradle on said board road.

Referring now to FIGS. 5 through 7, the stacking station of the method and stacking cradle of the apparatus is shown comprising a rectangular frame 39 having longitudinal members 40, 41 and transverse members 42. There are six spaced apart vertical pipe risers 43A through H welded to the longitudinal members. Transverse board stack supports 44 are welded between risers 43. Cradle draft tongues are formed by welded pipes 45, 46 and 47 connected to each side of the frame 39. A rigid end wall 48 is welded to end vertical risers 43A and 43H. An exposed metal grill 49 is welded to the inside face of wall 48 as shown in FIG. 5. Secured beneath the rectangular frame 39 as by welding are two conveyance means 50, 51 on which the board cradle rides as it is either pulled or pushed along the board road by the grab 25 as shown in FIG. 7.

IN OPERATION

To start removal of the board road the crawler unit of FIG. 2 is driven in over the board road 21 so that as shown in the upper lefthand corner of FIG. 1 the grab 25 by actuation of cylinder 37 can be positioned to first pick up the top layer of longitudinal boards 26 by closing the grab jaws which simultaneously grasps and unnails the boards 26 as shown sequentially in FIGS. 9 and 10, the top side works of the crawler unit then rotates 180° to place the grab full of boards over the stacking station or cradle 27 which has been placed behind the crawler unit 24 and the boards are dropped through the open top of the cradle onto the board supports 44. The top side unit is then rotated back to position the grab over the area where more boards are to be removed and this cycle is repeated.

As the boards are dropped onto the cradle as shown in FIG. 11 a man with a bending device bends the nails upstanding from the boards 26. Bundles of 50 boards are accumulated, 5 boards wide, and 10 layers high. A sling 52 is placed about the bundle and the grab 25. The sling and bundle are raised clear of the stacking cradle 27 and a man bales the bundles with a sturdy gauge baling wire and the bundle is transferred onto a truck, the sling removed and a plurality of bundles are transported over the unremoved portion of the board road to a large transport truck for return to inventory.

What is claimed:

1. For use with an apparatus for taking up a board road the bottom layer of boards of which have been laid with their major axes longitudinally of the road, an intermediate layer of boards with their axes transversely of the road and the top layer of boards of which are nailed to the intermediate layer with the major axes of the boards of the top layer being longitudinally of the direction of the board road, said apparatus having a self propelled mobile vehicle having board grasping and unnailing means carried by the vehicle for breaking the nailed connection between the longitudinally laid boards and the transversely laid boards, a board bundle stacking cradle comprising:

(a) an open top rectangular frame, (b) a pair of spaced apart conveyance means whose direction of conveyance is at right angles to the major axis of said rectangular frame in the direction of take up by the board grasping and unnailing means, (c) pairs of spaced apart posts upstanding from said rectangular frame and spaced along the major axis thereof, (d) an end wall at one end of said frame having a metal face on said end wall, (e) draft means extending to at least one side of said frame along its major axis secured to an adjacent pair of posts upstanding from said frame and positioned to be engaged by the board grasping and unnailing means for moving the sled on its runners in the direction of take up of the board road, (f) board stack support means across the width of the frame between opposed pairs of upstanding posts, and (g) said board grasping and unnailing means being carried by said vehicle between said longitudinally laid boards and said transversely laid boards for grasping a plurality of boards from the board road and placing them in said stacking cradle.

2. An apparatus for taking up a board road of multiple layers of boards which have been laid with thier axes both longitudinally and transversely of the road, the top layer of boards of which are nailed to the other layers with the major axes of the boards of the top layer being longitudinally of the direction of the board road comprising in combination:

(a) a self propelled mobile vehicle and a board stacking cradle for stacking the boards in layers into bundles for baling, (b) plural board grasping and unnailing means carried by said vehicle along the path of the road between said longitudinally laid boards and said transversely laid boards for picking up a plurality of boards at a single grasp for disassembling the road, (c) said stacking cradle having an open top rectangular frame having a major and minor axis, the major axis of said cradle being transversely of the board road being taken up, a pair of spaced apart conveyance means whose major axes are at right angles to the major axis of said rectangular frame in the direction of take up by the board grasping and unnailing means, said cradle being supported upon the board road being disassembled, pairs of spaced apart posts upstanding from said frame, an end wall at one end of said frame, draft means extending to at least one side of said frame along its major axis secured to an adjacent pair of posts upstanding from said frame and positioned to be engaged by said board grasping and unnailing means for moving the cradle on its conveyance means in the direction of the take up of the board road, and board stack support means transversely of the frame between opposed pairs of upstanding posts for stacking the boards in bundles for bailing.

3. The apparatus of claim 1 wherein the board grasping and unnailing means is a grab having openable and closeable jaws each having thick opposed walls with flat board engaging surfaces when the jaws are closed to grasp the boards firmly.

4. The apparatus of claim 1 wherein the board stacking sled draft means is positioned to be engaged by the jaws of the grab to advance the board bundling cradle in the direction of take up.

5. The apparatus of claim 2 wherein the board grasping and unnailing means is a grab having openable and closeable jaws each having thick opposed walls with flat board engaging surfaces for grasping a plurality of boards firmly from the board road when the jaws are closed to grasp the boards firmly and place them in said stacking cradle.

* * * * *